(12) United States Patent
Wintermantel et al.

(10) Patent No.: US 8,593,333 B2
(45) Date of Patent: Nov. 26, 2013

(54) RADAR SENSOR WITH FRONTAL AND LATERAL EMISSION

(75) Inventors: Markus Wintermantel, Lindau (DE); Arnold Moebius, Lindau (DE); Christoph Schwoerer, Lindau (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 353 days.

(21) Appl. No.: 12/994,754

(22) PCT Filed: Jul. 2, 2009

(86) PCT No.: PCT/DE2009/000947
§ 371 (c)(1),
(2), (4) Date: Nov. 24, 2010

(87) PCT Pub. No.: WO2010/000253
PCT Pub. Date: Jan. 7, 2010

(65) Prior Publication Data
US 2011/0080313 A1    Apr. 7, 2011

(30) Foreign Application Priority Data

Jul. 2, 2008    (DE) ................. 10 2008 032 070

(51) Int. Cl.
| | | |
|---|---|---|
| *G01S 13/00* | (2006.01) | |
| *H01Q 1/32* | (2006.01) | |
| *H01Q 19/10* | (2006.01) | |
| *H01Q 13/00* | (2006.01) | |

(52) U.S. Cl.
USPC .......... 342/70; 343/711; 343/755; 343/781 R; 343/834

(58) Field of Classification Search
USPC .............. 342/70–72, 147, 149–153; 343/711, 343/755, 781 R, 834
See application file for complete search history.

(56) References Cited

U.S. PATENT DOCUMENTS 5,008,678 A * 4/1991 Herman ................ 342/158
5,202,742 A * 4/1993 Frank et al. ............. 356/5.1
(Continued)

FOREIGN PATENT DOCUMENTS

DE    196 50 544    6/1997
DE    102005042729    3/2007
(Continued)

OTHER PUBLICATIONS

Daniel T. McGrath, "Calculation of Coupling Coefficients for Arrays With Skewed Lattices From Infinite Array Scan Reflection Data", IEEE Transactions on Antennas and Propagation, vol. 55, No. 7, Jul. 2007, pp. 2116-2119, IEEE Service Center, Piscataway, NJ, USA.

(Continued)

*Primary Examiner* — Jack W Keith
*Assistant Examiner* — Peter Bythrow
(74) *Attorney, Agent, or Firm* — W. F. Fasse

(57) ABSTRACT

A radar sensor includes a housing of radar-transmissive material, a circuit board in the housing, first and second antennas of several patch elements on the same or opposite surfaces of the circuit board, and a metal or metallized support supporting a rear surface of the circuit board. The first antenna has a beam axis that extends out through a front of the housing at an angle in a range from 45° to 90° relative to the circuit board plane. The sensor further includes a beam deflection structure arranged within the housing to deflect a beam axis of the second antenna out through the housing at an angle in a range from 0° to 45° relative to the circuit board plane.

18 Claims, 7 Drawing Sheets

(56) References Cited

U.S. PATENT DOCUMENTS

| | | | | |
|---|---|---|---|---|
| 5,454,442 | A * | 10/1995 | Labuhn et al. | 180/169 |
| 5,523,764 | A | 6/1996 | Martinez et al. | |
| 5,530,447 | A * | 6/1996 | Henderson et al. | 342/70 |
| 5,579,021 | A * | 11/1996 | Lee | 343/781 P |
| 5,657,024 | A * | 8/1997 | Shingyoji et al. | 342/175 |
| 5,686,923 | A * | 11/1997 | Schaller | 342/352 |
| 5,717,399 | A * | 2/1998 | Urabe et al. | 342/70 |
| 5,724,042 | A * | 3/1998 | Komatsu et al. | 342/175 |
| 5,760,886 | A * | 6/1998 | Miyazaki et al. | 356/5.01 |
| 5,815,112 | A | 9/1998 | Sasaki et al. | |
| 5,825,333 | A * | 10/1998 | Kudoh et al. | 343/781 R |
| 5,877,726 | A * | 3/1999 | Kudoh et al. | 343/700 MS |
| 5,940,011 | A * | 8/1999 | Agravante et al. | 340/903 |
| 5,949,365 | A * | 9/1999 | Wagner | 342/70 |
| 6,014,108 | A * | 1/2000 | Lynch et al. | 343/753 |
| 6,057,797 | A * | 5/2000 | Wagner | 342/70 |
| 6,091,363 | A * | 7/2000 | Komatsu et al. | 343/700 MS |
| 6,097,332 | A * | 8/2000 | Crosby, II | 342/72 |
| 6,127,965 | A * | 10/2000 | McDade et al. | 342/159 |
| 6,130,640 | A * | 10/2000 | Uematsu et al. | 342/175 |
| 6,204,755 | B1 * | 3/2001 | Kikuchi | 340/435 |
| 6,232,910 | B1 * | 5/2001 | Bell et al. | 342/70 |
| 6,396,448 | B1 * | 5/2002 | Zimmerman et al. | 343/753 |
| 6,480,160 | B1 * | 11/2002 | Bjornholt et al. | 343/754 |
| 6,492,949 | B1 * | 12/2002 | Breglia et al. | 343/700 MS |
| 6,563,456 | B1 * | 5/2003 | Hamman et al. | 342/175 |
| 6,577,269 | B2 * | 6/2003 | Woodington et al. | 342/70 |
| 6,646,620 | B1 * | 11/2003 | Bjornholt et al. | 343/882 |
| 6,657,581 | B1 * | 12/2003 | Lippert et al. | 342/70 |
| 6,717,544 | B2 * | 4/2004 | Nagasaku et al. | 342/27 |
| 6,750,810 | B2 * | 6/2004 | Shinoda et al. | 342/149 |
| 6,833,806 | B2 * | 12/2004 | Nagasaku et al. | 342/27 |
| 6,864,831 | B2 * | 3/2005 | Woodington et al. | 342/70 |
| 6,897,819 | B2 * | 5/2005 | Henderson et al. | 343/713 |
| 7,109,938 | B2 * | 9/2006 | Franson et al. | 343/767 |
| 7,132,976 | B2 * | 11/2006 | Shinoda et al. | 342/70 |
| 7,154,432 | B2 * | 12/2006 | Nagasaku et al. | 342/27 |
| 7,173,561 | B2 * | 2/2007 | Isaji | 342/70 |
| 7,187,334 | B2 * | 3/2007 | Franson et al. | 343/713 |
| 7,268,722 | B2 * | 9/2007 | Gottwald et al. | 342/70 |
| 7,346,453 | B2 * | 3/2008 | Matsuoka | 701/301 |
| 7,362,259 | B2 * | 4/2008 | Gottwald | 342/70 |
| 7,453,411 | B2 * | 11/2008 | Nagai | 343/781 P |
| 7,576,701 | B2 * | 8/2009 | McGrath et al. | 343/754 |
| 7,630,061 | B2 | 12/2009 | Lehre et al. | |
| 7,663,533 | B2 * | 2/2010 | Toennesen et al. | 342/70 |
| 8,339,526 | B2 * | 12/2012 | Minikey et al. | 349/11 |
| 2001/0026237 | A1 * | 10/2001 | Okai et al. | 342/70 |
| 2002/0067314 | A1 * | 6/2002 | Takimoto et al. | 343/713 |
| 2002/0163478 | A1 * | 11/2002 | Pleva et al. | 343/853 |
| 2002/0175852 | A1 * | 11/2002 | Zoratti et al. | 342/70 |
| 2005/0110673 | A1 * | 5/2005 | Izumi et al. | 342/70 |
| 2005/0195383 | A1 * | 9/2005 | Breed et al. | 356/4.01 |
| 2005/0231420 | A1 | 10/2005 | Brookner et al. | |
| 2005/0285773 | A1 * | 12/2005 | Hartzstein et al. | 342/70 |
| 2006/0066474 | A1 * | 3/2006 | Shirakawa | 342/147 |
| 2006/0092076 | A1 * | 5/2006 | Franson et al. | 343/700 MS |
| 2007/0152874 | A1 * | 7/2007 | Woodington | 342/159 |
| 2007/0182619 | A1 * | 8/2007 | Honda et al. | 342/80 |
| 2007/0205938 | A1 * | 9/2007 | Zimmermann et al. | 342/69 |
| 2007/0222662 | A1 * | 9/2007 | Toennesen et al. | 342/27 |
| 2007/0241978 | A1 * | 10/2007 | Cheng | 343/754 |
| 2008/0046150 | A1 * | 2/2008 | Breed | 701/45 |
| 2008/0303711 | A1 * | 12/2008 | Matsuoka | 342/196 |
| 2008/0312830 | A1 * | 12/2008 | Liu et al. | 701/301 |
| 2010/0033389 | A1 * | 2/2010 | Yonak et al. | 343/755 |
| 2010/0149061 | A1 * | 6/2010 | Haziza | 343/779 |
| 2011/0074620 | A1 * | 3/2011 | Wintermantel | 342/70 |
| 2011/0074621 | A1 * | 3/2011 | Wintermantel | 342/70 |
| 2011/0080314 | A1 * | 4/2011 | Wintermantel | 342/147 |

FOREIGN PATENT DOCUMENTS

| | | |
|---|---|---|
| EP | 0 831 553 | 3/1998 |
| EP | 0 947 852 | 10/1999 |
| EP | 1 548 458 | 6/2005 |
| EP | 1 624 317 | 2/2006 |
| KR | 1020070099195 | 10/2007 |
| WO | WO2005/073753 | 8/2005 |

OTHER PUBLICATIONS

M. M. Abousetta et al., "On the use of some FMCW transmission schemes for radar angular resolution improvement", Radar 92 International Conference, Brighton UK, Jan. 1, 1992, pp. 335-339, BNSDOCID: XP006514831.

PCT Examiner Joseph Roost, International Search Report of the International Searching Authority for International Application PCT/DE2009/000947, mailed Jan. 7, 2010, 3 pages, European Patent Office, HV Rijswijk, Netherlands.

PCT Examiner Joseph Roost, English Translation of PCT Written Opinion of the International Searching Authority for International Application PCT/DE2009/000947, mailed Jan. 7, 2010, 5 pages, European Patent Office, HV Rijswijk, Netherlands.

US Examiner T. A. Brainard, Office Action in U.S. Appl. No. 12/994,752, mailed Sep. 19, 2012, 8 pages, USPTO, Alexandria, VA, USA.

US Examiner T. A. Brainard, Office Action in U.S. Appl. No. 12/994,752, mailed Sep. 19, 2012, 7 pages, USPTO, Alexandria, VA, USA.

US Examiner F. J. McGue, Office Action in U.S. Appl. No. 12/994,755, mailed Nov. 15, 2012, 7 pages, USPTO, Alexandria, VA, USA.

US Examiner F. J. McGue, Notice of Allowance in U.S. Appl. No. 12/994,748, mailed Dec. 3, 2012, 5 pages, USPTO, Alexandria, VA, USA.

US Examiner T. A. Brainard, Office Action in U.S. Appl. No. 12/994,752, mailed Feb. 6, 2013, 8 pages, USPTO, Alexandria, VA, USA.

US Examiner F. J. McGue, Notice of Allowance in U.S. Appl. No. 12/994,755, mailed Mar. 7, 2013, 5 pages, USPTO, Alexandria, VA, USA.

\* cited by examiner

RADAR SENSOR WITH FRONTAL AND LATERAL EMISSION

FIELD OF THE INVENTION

The invention refers to radar system for use in driver assistance systems in the motor vehicle. According to invention the radar system has a frontal and a lateral emission and is suitable in particular for the implementation of a lane change assistant.

BACKGROUND INFORMATION

Motor vehicles are increasingly equipped with driver assistance systems, which with the aid of sensor systems detect the environment and from the thus recognized traffic situation derive automatic reactions of the vehicle and/or instruct, especially warn the drivers. Here, a distinction is made between comfort and safety functions.

As a comfort function FSRA (Full Speed Range Adaptive Cruise Control) plays the most important roll in the current development. The vehicle adjusts the true speed to the desired speed predefined by the driver, provided the traffic conditions permit this, otherwise the true speed is automatically adapted to the traffic situation. As a second important safety function the lane change assistant currently establishes, which indicates to the driver and/or warns him with a set turn signal, if there is another vehicle on the adjacent lane, which has to be observed when changing the lane, in particular to avoid accidents and hazardous situations, which would force this other vehicle to brake sharply or to make an uncontrolled lane change on his part.

In addition to an increase of the comfort, safety functions are increasingly the focus, whereby the reduction of the braking and/or stopping distance in emergency situations plays the most important role. The spectrum of the corresponding driver assistance functions extends from an automatic priming of the brake for reducing the brake latency (pre-fill), via an improved brake assistant (BAS+) up to the autonomous emergency braking.

For driver assistance systems of the above described type radar sensor are mainly used today. Also at poor weather conditions they work reliably and can measure in addition to the distance of objects also directly their radial relative speed via the Doppler effect. As transmission frequencies, here 24 and 77 GHz are used.

Currently available radar sensor only have a frontal detection area of at maximum approx. −75 . . . +75°. For implementing a high-performance lane change assistant, however, it is necessary that the detection area further opens towards the side, so that one can look quasi around the corner; this is in particular important for situations, in which the own vehicle passes slowly another in particular smaller vehicle and the latter is in the dead angle region of the side mirrors. In order to realize such a laterally extended detection area, according to the state of the art either a second sensor with another installation orientation or at least an additional, differently oriented high-frequency printed circuit board is necessary, which increases significantly the system costs.

SUMMARY OF THE INVENTION

It is, therefore, the object of the invention to provide an inexpensive sensor with a frontal and lateral detection area.

This object is achieved in principle with the aid of a radar system in accordance with the invention. Here, it is shown how to realize a lateral emission using elemental emitters on a level or planar printed circuit board, for which purpose elemental emitters emitting directly laterally arranged at the edge of the board and/or beam deflections at reflecting surfaces or with correspondingly formed dielectric materials of elemental emitters emitting frontally are used.

The advantages of the invention result from the fact that a sensor with frontal and lateral detection area can be implemented inexpensively, which is suitable in particular for the implementation of a lane change assistant, but can lead also with other functions to a significant reduction of the system costs, since the number of the sensors required in the vehicle can be reduced, if the sensor according to invention can be installed in the region of the vehicle corners. A reduced number of required sensors has naturally still other advantages such as for example the reduction of the required space and a reduced vehicle weight.

DETAILED DESCRIPTION OF EXAMPLE EMBODIMENTS OF THE INVENTION

The invention is now explained on the basis of exemplary embodiments of radar systems and realizations of their antennas.

Figure 1:
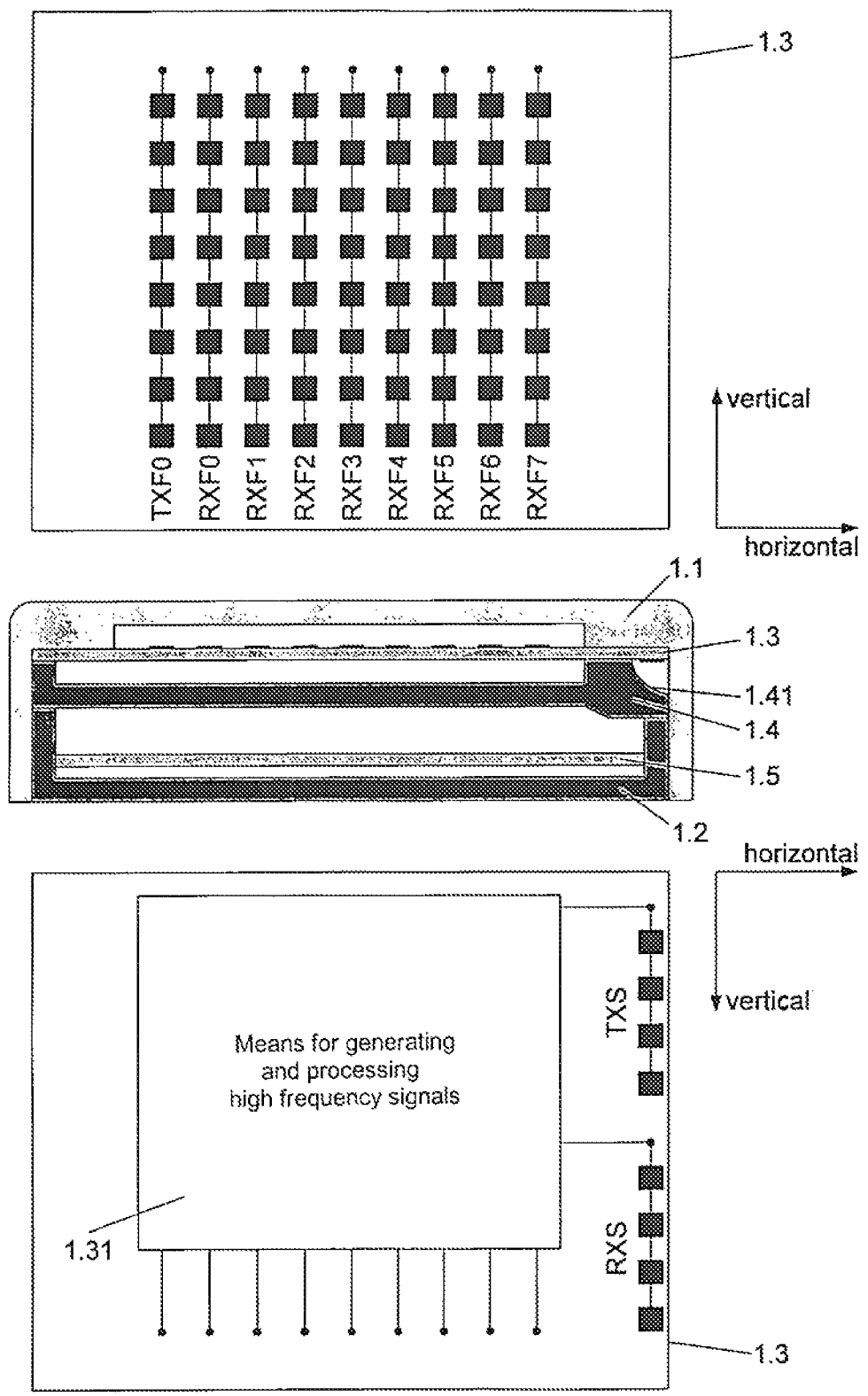
In FIG. 1 a horizontal section through the first form of embodiment of a radar sensor is shown in the middle, and on the top and bottom the front and/or rear face of the high-frequency board of this sensor is shown.

In FIG. 1 in the middle a horizontal section through a radar sensor is shown. In front and at the side the sensor is enclosed by a plastic housing 1.1, which lets the radar waves through as unobstructed and uninfluenced as possible. On the back the sensor comprises a cover 1.2. Between them viewed from the front a board 1.3 is located, which contains the high-frequency components, thus working at the radar frequency (e.g. in the 24 GHz-range), then the internal support 1.4 consisting of metal or metallized plastic, which serves as a constructionally supporting part and for the shielding of the boards, and finally the board 1.5 for the low-frequency components, in particular for the digital signal evaluation.

Figure 2:
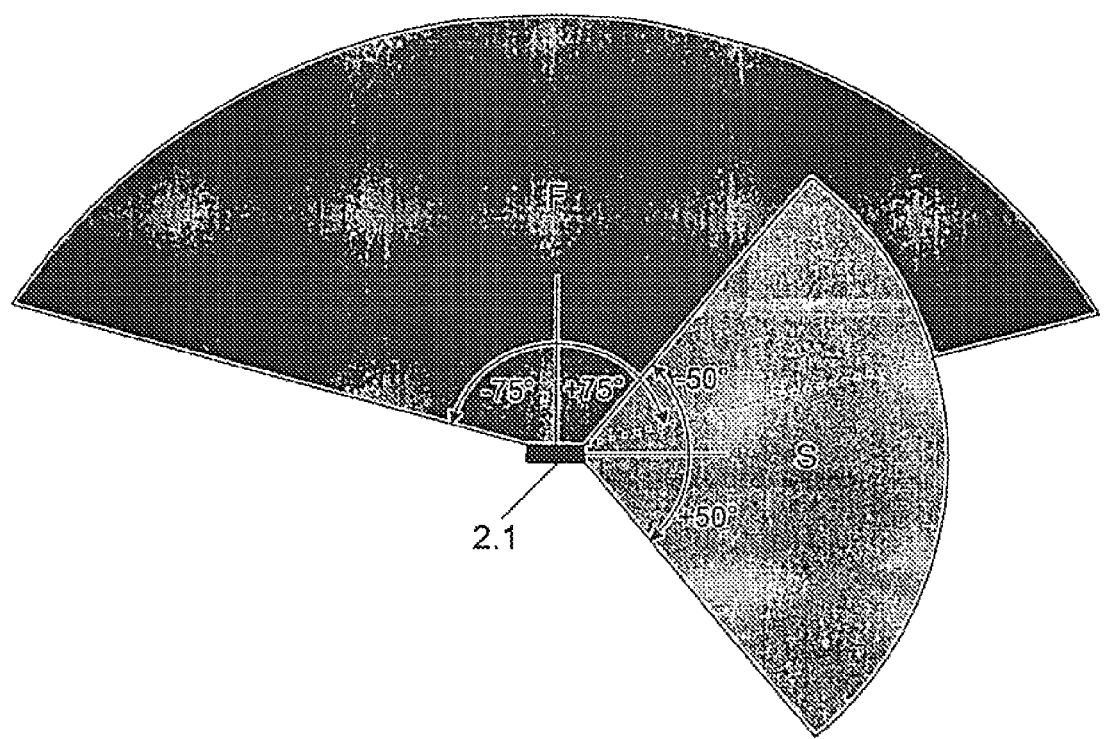
FIG. 2 shows in top view the two detection areas of the radar sensor.

On the front of the high-frequency board 1.3 represented on the top in FIG. 1 and on its rear face (see FIG. 1 on the bottom) there are transmitter antennas for emitting the transmission signals and receiver antennas for receiving the transmission signals reflected at objects. Transmitter and receiver antennas are formed as patch antennas in printed structure. The transmitter antenna TXF0 and the receiver antennas RXF0-7 on the board front serve for detecting the region in front of the sensor; FIG. 2 shows in the top view said frontal detection area of the sensor 2.1 there referred to as F. Each single rectangular patch represents a transmitting and/or receiving individual element, in the following also referred to as elemental emitter, and has a very wide beam cone, whose center stands vertical to the board. Since these antennas on the board front consist only of a vertical patch column (i.e. 8 patches arranged one above the other), their beam cone in azimuth (i.e. in the horizontal) has the same width as the beam cone of each individual patch and lies in the range of −75° . . . 75° to the perpendicular on the board. In elevation (i.e. in the vertical a closer detection area of approximately −10 . . . +10° arises as a result of the 8 patches arranged one above to the perpendicular on the board. In elevation (i.e. in the vertical) a more narrow detection area of approximately −10 . . . +10° arises as a result of the 8 patches arranged one above the other to perpendicular on the board. Based on the fact that there are 8 receiver antennas equidistant in horizontal direction, in the signal processing means a digital beam formation with the aid of a discrete fourier transformation (DFT) can be performed, and thus in the detection area F in front of the sensor the azimuthal angles of objects can be determined accurately and objects with different azimuth angles can be separated alone above them.

Apart from the means 1.31 for generating and processing high-frequency signals on the board rear face (see FIG. 1 on the bottom) the respective 4 patches arranged one above the other of the transmitter antenna TXS and the receiver antenna RXS are located. The emission of these patches is diverted over the metallic or metalized surface 1.41 at the internal support 1.4 towards the side, so that the antennas TXS and RXS generate the lateral detection area S represented in FIG. 2, which with regard to the board level has an azimuthal detection area of approximately −50° . . . +50°. Alone with the signals received in RXS at a point in time only a statement can be made, whether there are objects in this detection area, however, their azimuth angle cannot be determined and they cannot be separated alone above the azimuth angle. A separation is only possible via other measured sizes such as for example distance and radial relative speed and/or via the temporal course of measured dimensions while assuming certain object hypotheses; the latter can be used also for the angle determination and is explained further below.

Figure 3:
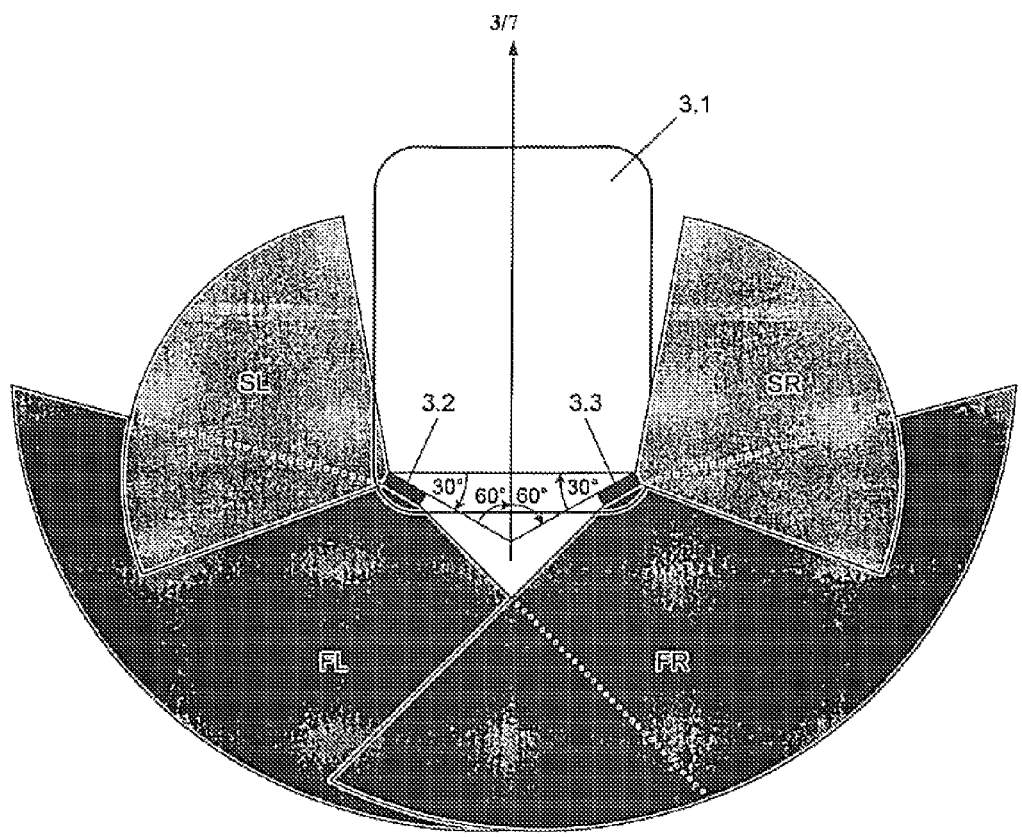
FIG. 3 shows in top view the installation position in the vehicle and the detection area of the two radar sensors for the implementation of a lane change assistant.

Such radar sensors are used for example for implementing a lane change assistant, which indicates to the driver and/or warns him with a set turn signal, if there is another vehicle on the adjacent lane, which has to be observed when changing the lane, in particular to avoid accidents and hazardous situations, which would force this other vehicle to brake sharply or to make an uncontrolled lane change on his part. For such driver assistance functions—as is shown in FIG. 3 on top view—two of the radar sensors 3.2 and 3.3 presented above are installed according to FIG. 1 at the rear left and right side at the vehicle 3.1 (typically behind the plastic bumper); here the mounting angle with regard to its amount is tilted by 60° to the longitudinal direction of the vehicle (i.e. by 30° to the rear). In FIG. 3 the detection areas of the two sensors are shown. The two detection areas FL and FR which are frontal with regard to the respective sensor serve for detecting vehicles, which are located behind one's own vehicle or on the height of the rear of the vehicle. In this detection area the azimuth angle of objects can be determined with the aid of a digital beam formation by a DFT over the received signals of the 8 receiver antennas RXF0-7 in such an accurate manner that also even at the instance of 80 m vehicles can be correctly allocated to the lanes; if a vehicle is detected at this distance, which approaches with a high relative speed, it is relevant for the lane change assistant only if it is located on the adjacent lane (and not e.g. on a three-lane roadway two lanes beside the own lane).

However, the detection areas FL and FR do not cover the complete region beside the vehicle, in particular not the middle and front portion; this is critical in particular in such situations, where the own vehicle slowly passes another, in particular smaller vehicle and said vehicle is in the dead angle region of the side mirrors. For this purpose detection areas SL and SR lateral to the respective sensor are required. Without the implementation according to invention of these lateral detection areas by deflecting the beam direction of elemental emitters arranged on the high-frequency board, for this purpose either a respective second sensor with another installation orientation or at least an additional, differently oriented high-frequency board would be necessary, which would significantly increase the system costs.

Figure 4:
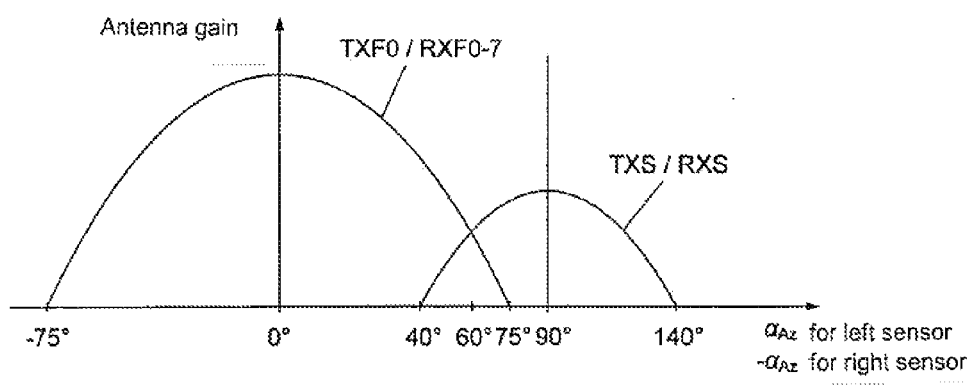
In FIG. 4 the two-way antenna diagrams for the antennas looking frontally and laterally over the azimuth angle are shown.

The angle measuring accuracy in the two frontal detection areas FL and FR which are frontal with regard to the respective sensor decreases towards the outside (i.e. the amount of the angle increasing in relation to the perpendicular on the sensor); this is primarily caused by the nonlinear, outwards flattening representation between the azimuth angle and the phase difference of the received signals of adjacent receiver antennas RXF0-7, this is added by the outwards decreasing signal-noise-ratio by a smaller antenna gain. Therefore, in the outer region of FL and FR facing the vehicle side in addition an angle estimation is made by amplitude comparison with the level of the antenna RXS received in the respective lateral detection area SL and/or SR. In FIG. 4 above the azimuth angle the two-way antenna diagrams (i.e. for transmission and reception) for the frontal antennas (TXF0/RXF0-7) and the lateral antennas (TXS/RXS) are shown; the additional angle estimation by amplitude comparison is performed approximately in the azimuth angle range 60° . . . 75° related to the sensor (for the left sensor) and/or −60° . . . −75° (for the right sensor), where the level of the frontal antennas strongly drops, whereas the level of the lateral antennas increases, which results in a strong change of the level proportions. For the level of the frontal antennas expediently the level resulting after the digital beam formation and not the individual levels of the receiver antennas is used—the latter could lead to errors in multi-object situations. Apart from an amplitude comparison also the phase relations of received signals from frontal and lateral receiver antennas could be evaluated, wherein then the horizontal distance of the phase centers of these antennas is to be considered.

By the measures described so far it is possible to estimate the azimuth angle of objects up to 15° laterally to the front. In the part of the detection areas SL and SR showing further to the front (i.e. outside of the regions FL and FR) from the signals received at a point in time no general azimuth angle estimation can be performed; only while asserting certain object hypotheses this is possible from the values and/or the temporal courses of the measured dimensions, which shall be explained now on the basis of some examples:

If an object moving parallel to one's own vehicle comes from the front into the lateral detection area SL or SR, then the amount of the azimuth angle with regard to the sensor decreases and thus the associated two-way antenna gain first increases, before after exceeding the maximum again decreases (see FIG. 4). Assuming from this hypothesis as well as from a constant reflectivity (i.e. a constant reflection cross section) and considering the influence of a possibly changing object distance (which is measured directly), then by comparing the measured level with the known course of the antenna gain over the azimuth angle rough assertions can be made on said antenna gain.

The relative speed radial to the sensor of a stationary object is dependent on the azimuth angle and the true airspeed of the vehicle. Since the latter is known, from the radial relative speed measured by the sensor under the hypothesis that it belongs to a stationary object, its azimuth angles can be suggested. In principle, for a hypothesis of stationary objects a variety of SAR methods (SAR=Synthetic Aperture Radar) for determining their azimuth angle can be used.

The radial relative speed measured by the sensor of a vehicle moving parallel to one's own vehicle with a constant absolute speed is dependent on its azimuth angle and the difference between the true airspeed and the absolute speed of this vehicle. Since there are two variables with the azimuth angle and the absolute speed of the other vehicle, for such a hypothesis the course of the measured radial relative speed must be evaluated over a certain period.

Figure 5:
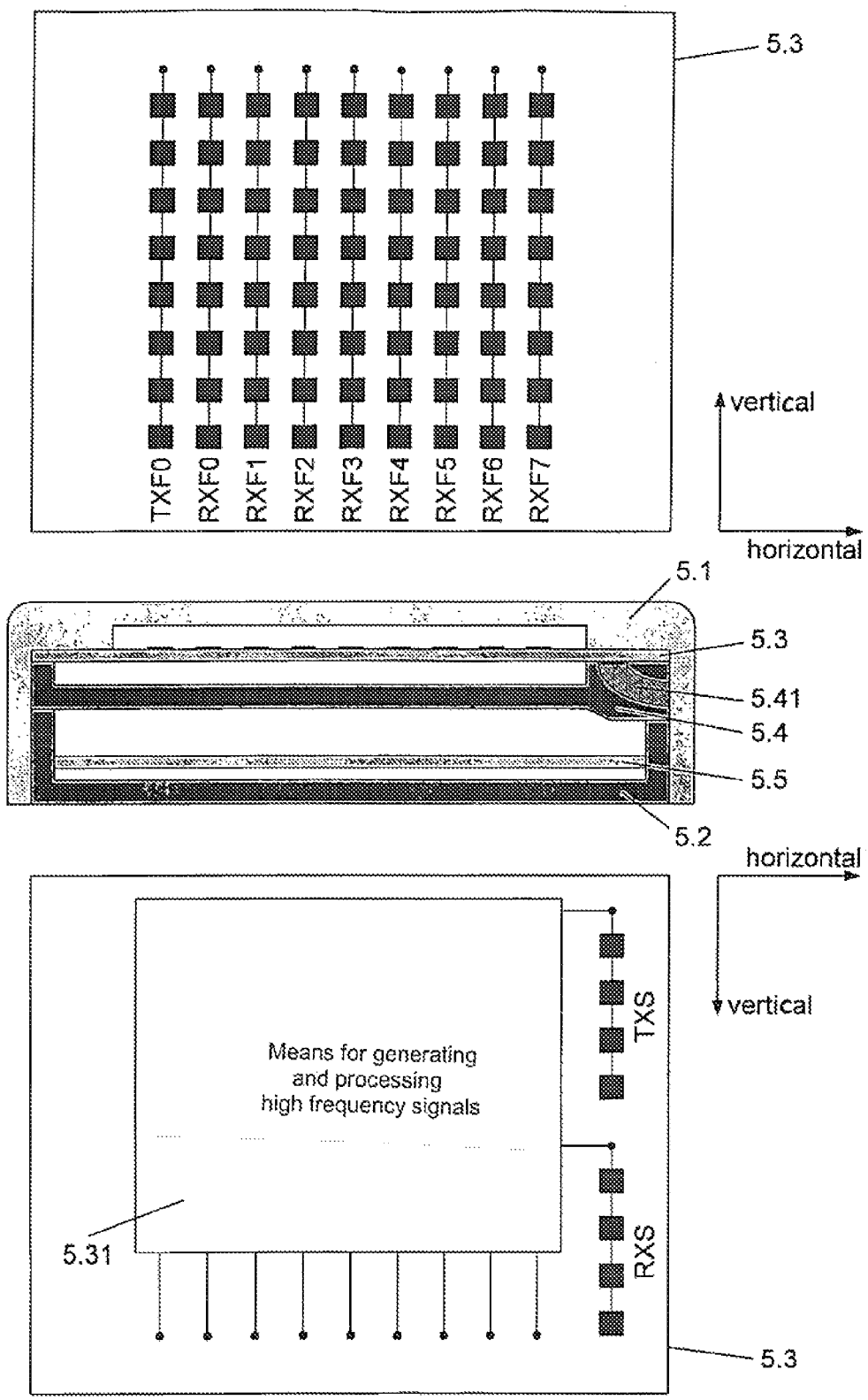
In FIG. 5 a horizontal section through the second form of embodiment of a radar sensor is shown in the middle, and on the top and bottom the front and/or rear face of the high-frequency board of this sensor is shown.

For implementing a lateral emission of elemental emitters arranged on the high-frequency board, so far a deflection at a correspondingly formed metallic surface was used. As an alternative, however, there are also other possibilities; as an example now the following are explained in detail:

The beam path of elemental emitters arranged on the high-frequency board is diverted to the side by waveguide structures. FIG. 5 shows a horizontal section through the radar sensor with the waveguides 5.41 realized in the internal support 5.4; the high-frequency board (front shown on the top in FIG. 5, bottomside on the bottom) changes in relation to the original embodiment according to FIG. 1 only by a slightly indented position of the patches for the antennas TXS and RXS diverted to the side.

The beam path of elemental emitters arranged on the high-frequency board is diverted to the side with the aid of correspondingly formed structures of dielectric material, wherein these structures of dielectric material are preferably arranged above the elemental emitters and are part of a plastic housing part. This method can also be combined in combination with the deflection by reflecting surfaces or waveguide structures.

Figure 6:
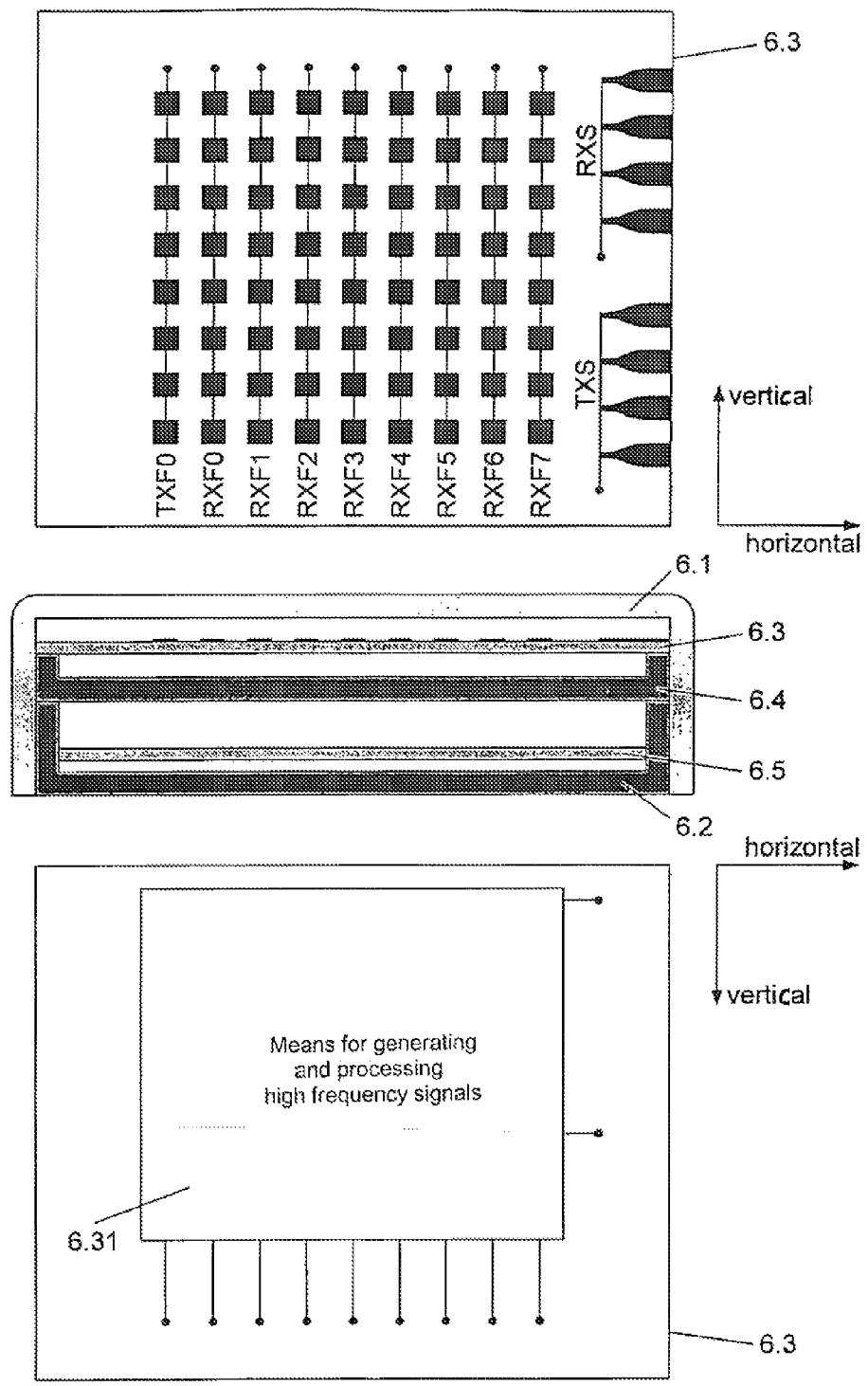
In FIG. 6 a horizontal section through the third form of embodiment of a radar sensor is shown in the middle, and on the top and bottom the front and/or rear face of the high-frequency board of this sensor is shown.

Elemental emitters in printed structure are used, whose antenna pattern of said antenna stands also without additional measures already laterally to the board. For this purpose for example suitably formed branch lines, ending at the edge of the board, can be used, which act as slot radiators. FIG. 6 on the top shows the front of the high-frequency board 6.3 of such an arrangement with branch lines to the edge, which realize the laterally emitting antennas TXS and RXS. Consequently, no deviation measures are a required on the one hand (see section through the arrangement according to FIG. 6 on the middle) and on the other hand no patches are required on the board rear face, which is shown in FIG. 6 on the bottom).

The arrangements considered so far in the lateral detection area alone have no possibility to determine the azimuth angle from the signals received at a point in time, since there is only one transmitter and receiver antenna. In order to overcome this disadvantage, several laterally directed transmitter and/or several laterally directed receiver antennas are necessary, the phase centers of which being each offset against each other seen in the direction perpendicular to the board; the azimuth angle estimation can then be performed from the phase positions of the received signals from different combinations of transmitter and receiver antennas, if for these combinations several such transmitter and/or several such receiver antennas with offset phase centers are used.

Figure 7:
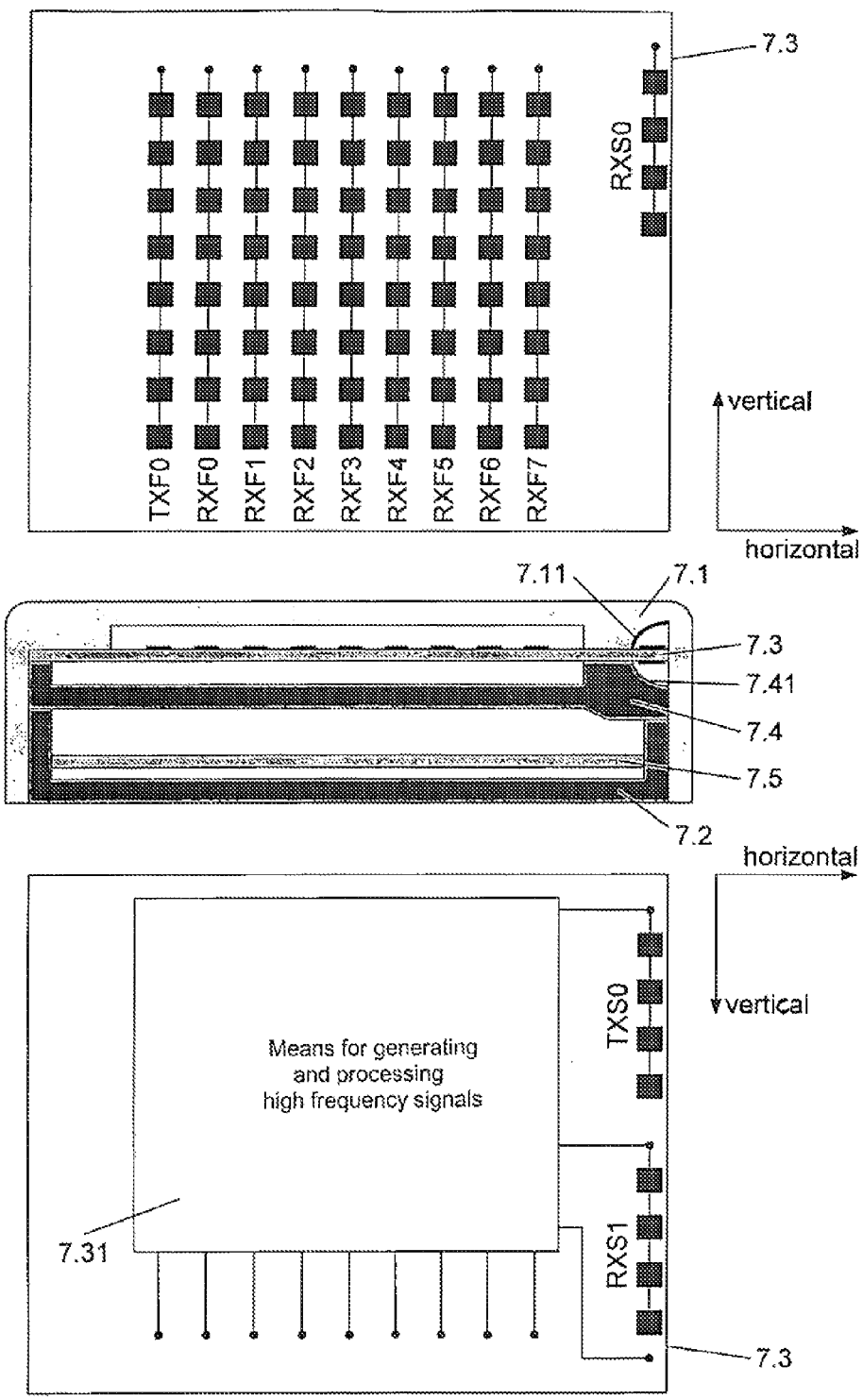
In FIG. 7 a horizontal section through the fourth form of embodiment of a radar sensor is shown in the middle, and on the top and bottom the front and/or rear face of the high-frequency board of this sensor is shown.

This shall now be explained with the example represented in FIG. 7. On the front of the high-frequency board 7.3 shown on the top in FIG. 7 there are patches at the edge for a laterally emitting receiver antenna RXS0 and on its bottomside represented in FIG. 7 there are patches for the laterally emitting transmitter antenna TXS0 and a second laterally emitting receiver antenna RXS1. For the lateral deflection of the emission of these patches again reflecting surfaces are used; as is shown in the section through the arrangement according to FIG. 7 center, this reflecting surface for the antennas TXS0 and RXS1 of the bottom surface of the board again is realized as part 7.41 of the interior carrier 7.4 consisting of metal or metallized plastic and for the antenna RXS0 of the board upper side by a locally metallized form 7.11 of the plastic housing 7.1 correspondingly designed over the patches.

Figure 8:
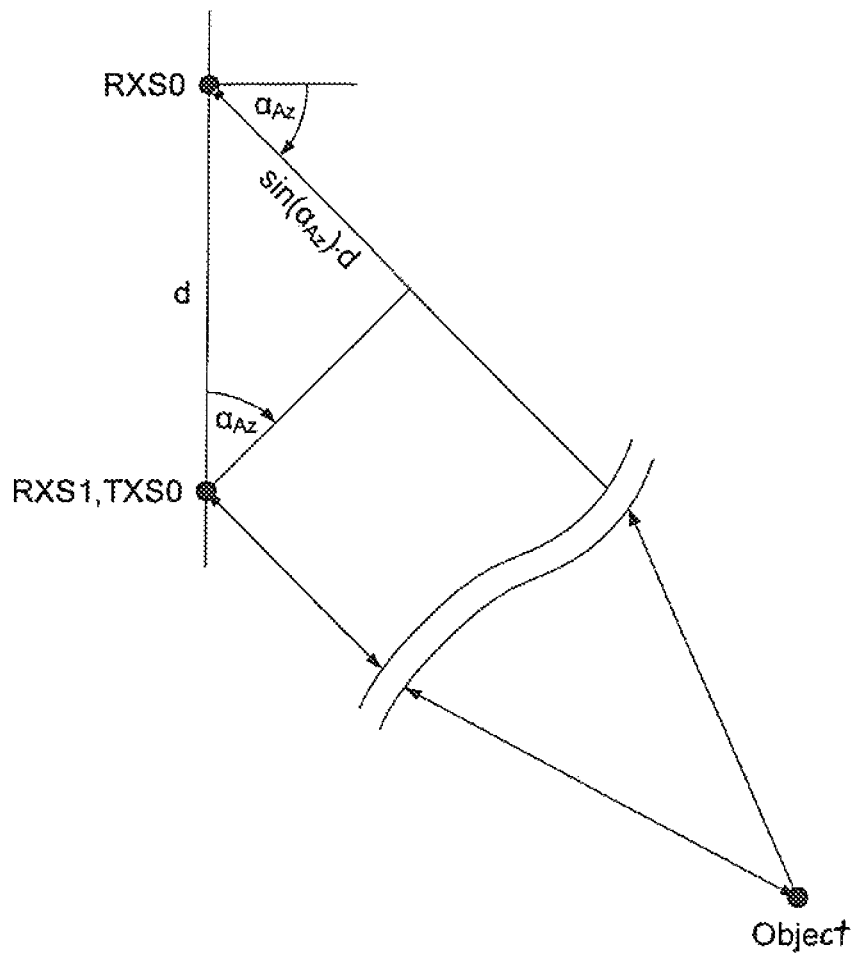
FIG. 8 shows for the arrangement according to FIG. 7 the different path lengths between the phase centers of the laterally looking receiver antennas and a far away point-shaped object with the azimuth angle $\alpha_{Az}$ related to the board level.

The phase centers of the two receiver antennas RXS0 and RXS1 thus are offset against each other in the direction perpendicular to the board by a measure d; in FIG. 8 the phase centers of the antennas are shown in vertical projection. Furthermore, FIG. 8 shows the beam paths to a far away point-shaped object with the azimuth angle $\alpha_{Az}$ related to the board level (the object is so far away that the beam paths can be assumed to be parallel, i.e. the object is in the far field of the antenna assembly). The beam length from the object to the receiver antenna RXS0 is larger by the value $\Delta r = \sin(\alpha_{Az}) \cdot d$ than to the receiver antenna RXS1. The phase of the received signal RXS1 therefore is in advance of the phase of the received signal of RXS0 by $\Delta \phi = 2\pi/\lambda \cdot \sin(\alpha_{Az}) \cdot d$, wherein $\lambda$ is the wavelength of the used radar frequency (with 24 GHz the wavelength is approximately 12.5 mm). Thus from a measured phase difference between the received signals of the two receiver antennas RXS0 and RXS1 the azimuth angle $\alpha_{Az} = \arcsin(\Delta \phi \cdot \lambda/(2\pi \cdot d))$ of the associated object can be determined.

However, it is to be considered here that phases and thus also phase differences can only be measured up to an unknown integral multiple of $2\pi$, so that only then in the azimuth angle determination no ambiguities arise, if the phase difference over the entire detection area is smaller than $2\pi$; for the detection area $-50° \ldots +50°$ here assumed to the board level the demand results that $d < \pi \cdot \lambda/(2\pi \cdot \sin(50°)) = 0.65 \cdot \lambda$ must be.

In the considered arrangement according to FIG. 7 the offset of the phase centers of two laterally looking antennas with regard to the direction perpendicular to the board is realized by the fact that the emission of patches located on the top and on the bottom on the board is diverted at reflecting surfaces to the side. However, such an offset of the phase centers of two antennas can also be realized by other measures; as examples the following are mentioned:

on the board front at the edge there are slot emitters, on the rear face there are patches with beam deflection at reflecting surfaces, on the board front there are both slot emitters located at the edge and also patches with beam deflection at reflecting surfaces, the phase center of which lies above the board, on the board rear face there are patches, the beam deflection of which is designed with the aid of waveguides or different reflecting surfaces that two different phase centers result in the direction perpendicular to the board.

It shall be noted that principally on the one hand also more than two different levels for the phase centers in the direction perpendicular to the board can be realized and on the other hand simultaneously several transmitter and several receiver antennas with phase centers each offset in this direction are possible. As a result the azimuth angles of objects can be more accurately determined and several objects can be separated alone over the azimuth angle.

With the prior arrangements each antenna is used only for transmission or reception. By suitable high-frequency components (e.g. printed ring couplers), however, it is also possible to use an antenna both for transmission and reception; thus if a common transmitter and receiver antenna looking to the side is realized, with a predetermined space the latter can be made twice as high as in the arrangements represented so far, which leads to a higher beam focusing in elevation direction.

The invention claimed is:

1. A radar sensor for recording the environment of a motor vehicle, comprising:
   transmission means for emitting transmission signals using several transmitter antennas;
   receiving means for receiving transmission signals reflected by objects using several receiver antennas; and
   signal processing means for processing the received signals,
   wherein:
   each one of the several transmitter antennas and several receiver antennas respectively includes at least one transmitting or receiving individual antenna element, referred to henceforth as an elemental emitter, which is located on a front or rear face of a planar circuit board,
   said transmitter and receiver antennas include at least one first transmitter antenna and at least one first receiver antenna, which each respectively include at least one said elemental emitter located on the planar circuit board, wherein a beam axis of said first transmitter antenna and of said first receiver antenna outside the radar sensor is tilted at most 45° relative to a perpendicular on the circuit board,
   said transmitter and receiver antennas include at least one second transmitter antenna and at least one second receiver antenna, which each respectively include at least one said elemental emitter on the planar circuit board, wherein a beam axis of said second transmitter antenna and of said second receiver antenna outside the radar sensor is tilted at least 45° relative to the perpendicular on the circuit board,
   the elemental emitters have a printed structure, and a native beam axis of the elemental emitters without deflection is oriented at least approximately perpendicular to the circuit board whereby said elemental emitters are therefore henceforth referred to as frontal elemental emitters, and
   tilting the beam axis of these frontal elemental emitters and thereby realizing deflected laterally emitting elemental emitters is achieved by at least one of the following features:
   a) deflection of a beam path of the elemental emitters with metallic or metallized planar or curved reflective surfaces arranged over the elemental emitters, wherein the reflective surfaces are surfaces of an internal support or of a housing of the radar sensor,
   b) deflection of the beam path of the elemental emitters with waveguide structures, and/or
   c) deflection of the beam path of the elemental emitters with suitably formed structures of dielectric material arranged over the elemental emitters, wherein the dielectric material is a material of at least a part of a plastic housing of the radar sensor.

2. The radar sensor according to claim 1, wherein the frontal elemental emitters are arranged adjacent to an edge of the circuit board.

3. The radar sensor according to claim 1, wherein the tilting of the beam axis of the frontal elemental emitters is achieved by at least said feature a).

4. The radar sensor according to claim 1, wherein the tilting of the beam axis of the frontal elemental emitters is achieved by at least said feature b).

5. The radar sensor according to claim 1, wherein the tilting of the beam axis of the frontal elemental emitters is achieved by at least said feature c).

6. The radar sensor according to claim 1, with at least one said elemental emitter having the beam axis thereof lying at least approximately parallel or approximately perpendicular to the circuit board outside of the radar sensor.

7. The radar sensor according to claim 1, in which the elemental emitters are formed as patches.

8. The radar sensor according to claim 1, in which at least one of said antennas is used both for transmission and for reception.

9. The radar sensor according to claim 1, in which a tilting of the beam axis of one or more of said elemental emitters outside of the radar sensor by at least approximately 90° relative to the perpendicular on the circuit board is realized in that elemental emitters in printed structure are used, the beam axis of which without additional measures is oriented laterally to the side of the circuit board, and which in the following are referred to as lateral elemental emitters, wherein these lateral elemental emitters are arranged adjacent to the edge of the board and are realized as slot emitters.

10. The radar sensor according to claim 1, in which there are at least two said transmitter antennas and/or two said receiver antennas, the beam axis of which is tilted outside of the sensor by more than 45° to the perpendicular on the circuit board and the phase centers of which are offset against each other as seen in a direction perpendicular to the circuit board, wherein in the signal processing means, with the aid of the phase positions of the received signals from different combinations of transmitter and receiver antennas, for which at least two of such transmitter and/or two of such receiver antennas with offset phase centers are used, the angular position of objects in the direction perpendicular to the circuit board is estimated.

11. The radar sensor according to claim 10, in which the offset of the phase centers in the direction perpendicular to the circuit board is realized by at least one of the following measures:
   on both sides of the circuit board there is at least one of said deflected laterally emitting elemental emitters, or lateral slot emitters having a beam axis oriented laterally to the side of the circuit board,
   on the front face of the circuit board, there is at least one said lateral slot emitter and on the rear face of the circuit board there is at least one said deflected laterally emitting elemental emitter,
   on only one side of the circuit board there is both at least one said lateral slot emitter and at least one said deflected laterally emitting elemental emitter, the phase center of which lies above and/or below the circuit board, and/or on only the rear face of the circuit board, there is at least one said deflected laterally emitting elemental emitter, wherein the deflection is carried out in such manner that different phase centers result in the direction perpendicular to the circuit board.

12. The radar sensor according to claim 1, in which there is only one transmitter and one receiver antenna, of which the beam axis outside of the radar sensor is tilted by more than 45° to the perpendicular on the circuit board, and in which, in the signal processing means, while assuming predetermined object hypotheses from the values and/or the temporal courses of at least one measured value, the angular position of objects in the direction perpendicular to the circuit board is estimated.

13. The radar sensor according to claim 1, in which there is at least one receiver antenna having its beam axis outside of the sensor tilted at most 45° and at least one receiver antenna having its beam axis outside of the sensor tilted by more than 45° to the perpendicular on the circuit board, wherein detection areas of the receiver antennas overlap and within the overlapping region by amplitude comparison and/or phase comparison of signals and/or values that are derived from the received signals of such antennas or correspond to them, an angle estimation for objects is performed and/or ambiguities in the angle estimation are avoided.

14. The radar sensor according to claim 1, which, with regard to the radar sensor itself, looks forwardly (frontal detection area) towards its mounting surface in the vehicle, and lateral (lateral detection area).

15. The radar sensor according to claim 14, in which the frontal and the lateral detection areas touch or overlap, and for the frontal detection area there are several transmitter and/or several receiver antennas, whereby in the frontal detection area the azimuth angle of objects can be directly determined.

16. The radar sensor according to claim 14, in which at least one transmitter and one receiver antenna with frontal detection area are realized by elemental emitters formed in printed structure and arranged on the front side of the circuit board, and at least one transmitter and one receiver antenna with lateral detection area are realized by elemental emitters formed in printed structure and arranged at the edge of the circuit board on the rear side of the circuit board with deflection on said metallic or metallized planar or curved reflective surface, wherein this metallic or metallized planar or curved reflective surface is realized as part of a structural interior element of the radar sensor.

17. The radar sensor according to claim 1, which, with regard to the vehicle, looks to the rear and to the side for implementation of a lane change assistant.

18. A radar sensor comprising:
a housing of a radar-transmissive material;
a circuit board arranged within said housing;
a first antenna comprising plural patch elements on a front surface of said circuit board, and having a first beam axis that extends out through a front of said housing at an angle in a range from 45° to 90° relative to a plane of said circuit board;
a second antenna comprising plural patch elements on said front surface or on a rear surface of said circuit board;
a metal or metallized support that is arranged within said housing and that supports said rear surface of said circuit board; and
a beam deflection structure that is arranged within said housing and that is configured and positioned to deflect a second beam axis of said second antenna out through a side of said housing at an angle in a range from 0° to 45° relative to said plane of said circuit board,
wherein said beam deflection structure comprises a metal or metallized radar reflective surface, a radar waveguide structure or a dielectric radar deflection structure, and
wherein said beam deflection structure is formed in or on said support or said radar-transmissive material of said housing at a location perpendicularly adjacent to said second antenna relative to said plane of said circuit board.

\* \* \* \* \*